United States Patent
Menon et al.

(10) Patent No.: US 8,504,864 B2
(45) Date of Patent: Aug. 6, 2013

(54) DATA SENSOR COORDINATION USING TIME SYNCHRONIZATION IN A MULTI-BUS CONTROLLER AREA NETWORK SYSTEM

(75) Inventors: Sandeep Menon, Shelby Township, MI (US); Chaminda Basnayake, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 12/957,638

(22) Filed: Dec. 1, 2010

(65) Prior Publication Data

US 2012/0140861 A1 Jun. 7, 2012

(51) Int. Cl.
*G06F 1/12* (2006.01)
*G06F 13/42* (2006.01)

(52) U.S. Cl.
USPC ........... 713/401; 713/400; 713/501; 713/600; 370/350; 370/503; 370/519; 375/356; 375/362

(58) Field of Classification Search
USPC ................. 713/400, 401, 501, 600; 370/350, 370/503, 445, 519; 375/356, 362
See application file for complete search history.

(56) References Cited

U.S. PATENT DOCUMENTS

| | | | | |
|---|---|---|---|---|
| 8,014,423 | B2 * | 9/2011 | Thaler et al. | 370/503 |
| 2003/0169774 | A1 * | 9/2003 | Del Prado Pavon et al. | 370/503 |
| 2008/0263380 | A1 | 10/2008 | Dryer et al. | |
| 2010/0008273 | A1 * | 1/2010 | Stocks | 370/311 |
| 2010/0190517 | A1 * | 7/2010 | Wang et al. | 455/500 |

* cited by examiner

*Primary Examiner* — Thuan Du

(57) ABSTRACT

A method is provided for synchronizing time in an unsynchronized vehicle controller area network system. A master control unit receives a global time from a time synchronization source. The master control unit estimates a respective time delay in transmitting messages by electronic control units on each controller area network bus. The time delay is a difference between a time when a message is generated by a respective electronic control unit for transmission on a respective controller area network bus and a time when the message is transmitted on the respective controller area network bus. The global time is adjusted for each respective controller area network bus based on the estimated time delays associated with each respective controller area network bus. Global time messages from the master control unit are transmitted to each electronic control unit that include the adjusted global times for an associated controller area network bus.

20 Claims, 3 Drawing Sheets

DATA SENSOR COORDINATION USING TIME SYNCHRONIZATION IN A MULTI-BUS CONTROLLER AREA NETWORK SYSTEM

BACKGROUND OF INVENTION

An embodiment relates generally to vehicle controller area network systems.

Controller-area network (CAN) is a vehicle bus standard intended to allow electronic control units (ECUs) and other devices to communicate with one another without a central or host computer. Vehicle systems and subsystems have numerous ECUs that control actuators or receive data from sensing devices. Many subsystems that the ECUs control are independent subsystems having no communication with another subsystem, while other subsystems communicate and share data (e.g., engine control unit and the electronic braking control unit).

The CAN system is an asynchronous broadcast serial bus which allows messages to be communicated serially. Therefore, messages between ECUs when transmitted are not necessarily transmitted immediately over the CAN bus when a message is generated. If the CAN bus is free, the message is instantly transmitted. If more than one message is transmitted, the more dominant message is transmitted. This is known as an arbitration process. A CAN message with a highest priority will dominate the arbitration and a message transmitting at the lower priority will sense this and wait. This is achieved through a binary bit system using dominant bits and recessive bits. A CAN message includes an ID that identifies a message-type or sender. The ID consists of a predetermined number of data bytes. For example, an ID may consist of 8 data bytes utilizing "0"s and "1"s. Dominant bits are a logical "0" and recessive bits are a logical "1". Dominant bits receive the higher priority than do the recessive bits. During an arbitration process, the more dominant ID having the lower bit value will win arbitration and have priority.

Due to the delay in transmitting information in the recessive bits, data sharing and integration of data between two ECUs of different CAN buses in a multi-CAN bus architecture may result in out of synchronized data being integrated together if their clocks are not synchronized. That is, to integrate data, a processor must know that it is using data that is collected by the various sensors at substantially a same instant of time. ECUs utilize their local clocks to time-stamp data, and if the local clocks are not synchronized, then a mismatch of timed data may occur during data integration process. A vehicle could use an internal clock in attempts to synchronize the time of all the ECU's by sending out a clock signal; however, due to the asynchronous nature of the CAN system and delays that result in transmitting messages across different CAN buses, a message containing a clock signal may be delayed as well in getting to the ECU's which would result in the local clocks of the ECUs of different CAN buses being unsynchronized. In a vehicle-to-vehicle (V2V) case, it may also be relevant for vehicles to use sensor data from other vehicles to perform onboard sensor fusion and perform appropriate actuation and control. The sensors connected to CAN bus in remote vehicles which are transmitted using V2V messages need improved accuracy than what is available with using just the V2V time synchronization mechanism that is typically based on GPS.

SUMMARY OF INVENTION

An advantage of an embodiment is the synchronization of local clocks in an asynchronous controller area network having a plurality controller area network buses which allows the coordination of data from various sensors within a controller area network system. The delays associated with messages transmitted within each controller area network bus in the system are estimated and a global time is adjusted for each controller area network bus to account for the delays. Messages that include the adjusted global time for each respective controller area network bus are transmitted to the various devices to adjust and synchronize local clocks.

An embodiment contemplates a method of synchronizing time in an unsynchronized vehicle controller area network system. The system having a plurality of electronic control units in communication within one another via a plurality of controller area network buses. The electronic control units are in communication with sensing devices for collecting sensed data obtained by the sensing devices. Each electronic control unit transmits messages on the plurality of controller area network buses for sharing sensed data with other electronic control units (which may be within the vehicle in consideration or could be in another vehicle in the case of V2V). The plurality of electronic control units are in communication with a master control unit via the plurality of controller area network buses. The master control unit receives a global time from a time synchronization source. The master control unit estimates a respective time delay in transmitting messages by the electronic control units on each controller area network bus. The time delay is a difference between a time when a message is generated by a respective electronic control unit for transmission on a respective controller area network bus and a time when the message is transmitted on the respective controller area network bus. The global time is adjusted for each respective controller area network bus based on the estimated time delays associated with each respective controller area network bus. Global time messages from the master control unit in each vehicle are transmitted to each electronic control unit that include the adjusted global times for an associated controller area network bus. Each electronic control unit connected to the controller area network receiving a respective global time message synchronizes a local clock based on the adjusted global time in the respective global time message. Since a common notion of time is shared between multiple vehicles, the time stamp taken at a given sensor on a given vehicle could be translated to determine the time of occurrence of a sensing event on a different vehicle. The remote sensor data may be used as part of local sensor fusion to perform the necessary time synchronized actuation and control on the vehicle.

An embodiment contemplates a vehicle communication system that includes a plurality of sensing devices for obtaining vehicle-related data. A plurality of electronic control units receives vehicle-related data from the plurality of sensing devices. A plurality of controller area network buses coupled to the plurality of electronic control units transmits the vehicle-related data. A master control unit is in communication with each of the plurality of controller area network buses. The master control unit estimates a respective time delay for messages transmitted on each controller area network bus. The time delay is a difference between a time when messages are generated for transmitting and a time when messages are expected to be transmitted on an associated controller area network bus. A time synchronization source generates a global time. The global time is adjusted by the master control unit for each respective controller area network bus based on the respective time delay determined in each controller area network bus. The master control unit transmits a respective message on each controller area network bus that includes the respective adjusted global time for each controller area network bus. Each electronic control unit receiving the respective message synchronizes a local clock to the adjusted global time received in the respective message.

DETAILED DESCRIPTION

Figure 1:
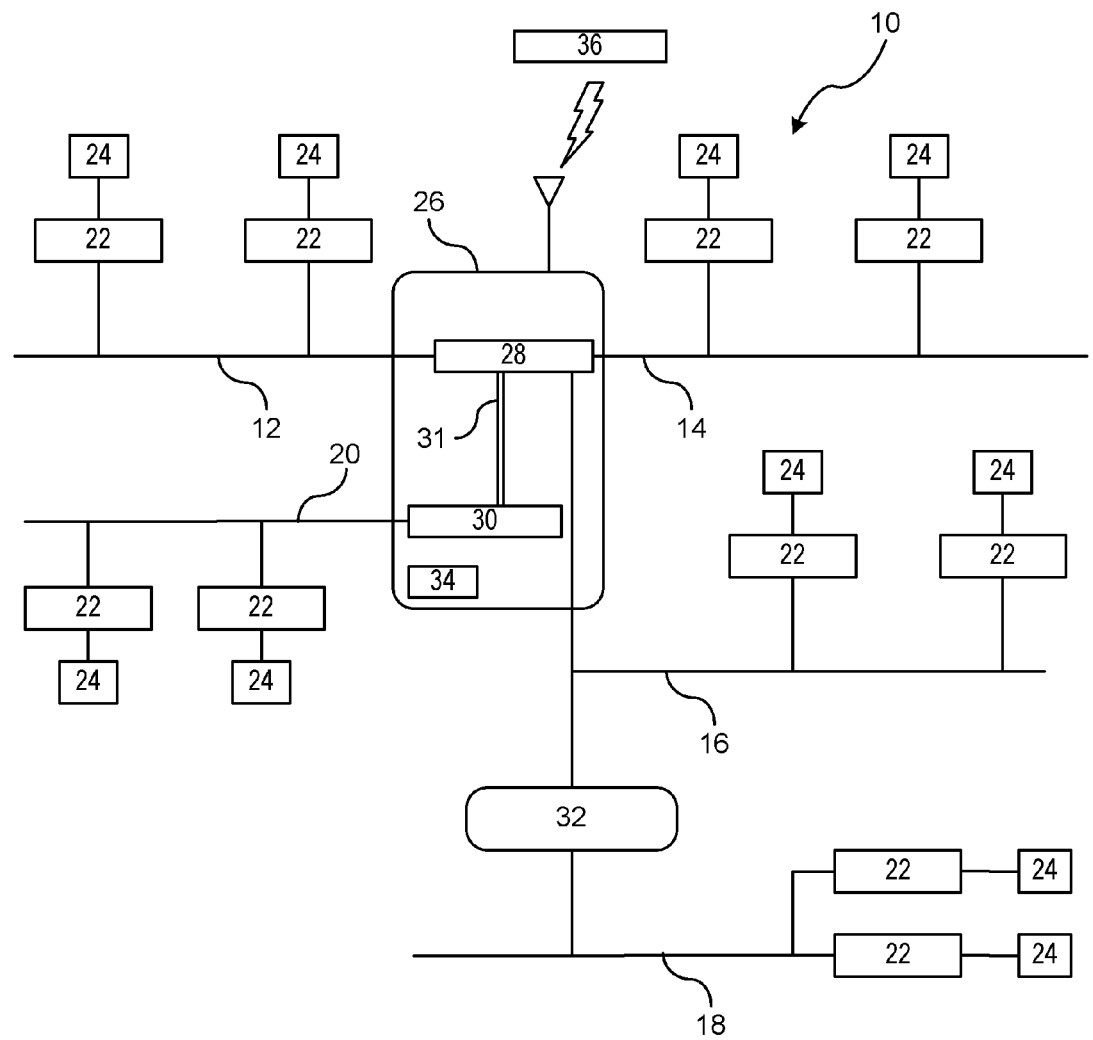
FIG. 1 is an architectural layout of a controller area network system.

There is shown in FIG. 1 an architectural block diagram of a vehicular controller area network (CAN) system 10 for synchronizing local clocks of electronic control units coupled to the network. The CAN system 10 includes a plurality of CAN buses, such as a first CAN bus 12, a second CAN bus 14, a third CAN bus 16, a fourth CAN bus 18, and a fifth CAN bus 20. It should be understood that the CAN system 10 may include more or less CAN buses than shown.

Each of the CAN buses are coupled to a plurality of electronic control units (ECUs) 22 which allow the ECUs to communicate with one another. Each of the plurality of ECUs 22 is coupled to one or more sensors 24. The term sensors used herein is meant to include actuators and other devices that exchange digital signals during operation. The sensors 24 are not directly connected to a respective CAN bus, but are connected through the ECU. For the purposes of this invention, it is understood that CAN networks are known in the art and other devices such as CAN controllers and transceivers which are typically integrated within the ECU are referred to as nodes and the details of their composition will not be discussed in detail herein. The CAN system 10 is an asynchronous broadcast serial bus network which transmits messages serially on each CAN bus. Therefore, any node may readily transmit a message if the respective CAN bus which it is communicating on is free. However, if two or more nodes are transmitting messages, then a message with a more dominant ID will have priority over the messages that have less dominant ID. Therefore, a message transmitted with a higher priority (i.e., more dominant ID) will always win the arbitration process and the message with the lesser priority (i.e., less dominant ID) will wait until the CAN bus is free or until that respective message is the most dominant ID waiting to transmit. As a result, there are inherent delays in the transmitting messages on the CAN-bus.

A master control unit 26 is shown in FIG. 1 that includes one or more microprocessors such as microprocessor 28 and microprocessor 30 that are coupled to the plurality of CAN buses for communicating with the plurality of ECUs 22. It should be understood that more or less microprocessors within the master control unit 26 may be utilized. Each of the microprocessors within the master control unit 26 communicates through a communication medium including, but not limited to, a universal asynchronous transmitter and receiver (UART) or serial peripheral interface bus.

The master control unit 26 is a dominant ECU controlling some operation of vehicle functionality during a current time period, but may change depending on the mode of operation of the vehicle. For example, the vehicle may utilize a wireless communication system (e.g., OnStar®) that provides in-vehicle security, safety, and communications service such as hands free calling, turn-by-turn navigation, and remote diagnostics systems. Under normal vehicle operations, the OnStar® ECU may be the master control unit 26. If vehicle-to-vehicle (V2V) communications are initiated between the host vehicle and other remote vehicles detected around the host vehicle, the master control unit 26 may change to the V2V communication ECU. The master control unit 26 is used in the present invention to synchronize time across devices coupled to the plurality of CAN-buses as will be described in detail later.

The CAN system 10, as shown in FIG. 1, further includes a gateway ECU 32 that provides system interoperability for joining together two CAN buses that are operating on different networks or different protocol settings that are not directly coupled through the master control unit 26. The CAN buses connected through the gateway ECU 32 are disconnected in terms of their real-time behavior, so the timing of events or messages can be hard to estimate even though the estimation of timing events within each respective CAN bus is fairly predictable.

Vehicle data from various sensors, actuators, and other devices are typically shared between subsystems for determining or predicting a vehicle operation or condition. Integration of multiple inputs from different sources provide better accuracy, availability, and reliability for a respective vehicle operation. For example, in a GPS system when GPS data is not available from a satellite source, the vehicle may rely on secondary data such as wheel speed sensor data, steering wheel angle sensor data, and yaw data to determine a vehicle position or vehicle direction. This secondary data may be supplied from different subsystems. As a result, it is pertinent that the data from the different subsystems must be substantially sensed at the same instance of time when integrated, otherwise the estimated output such as position or direction could be skewed. Such skewed results may be detrimental in applications, such as collision avoidance systems, where it is pertinent that the integrated data used to derive a result is time-synchronized. While integration of sensor data within a respective CAN-bus is relatively easy to synchronize and integrate, synchronization and integration of data from different CAN-buses is difficult since the different CAN-buses are typically asynchronous. That is, for a single CAN-bus, a clock signal can be transmitted on the CAN-bus and each of the respective ECUs on the CAN-bus will receive the message at substantially a same instant of time and synchronize their local clock. Although the message may be initially delayed from being transmitted due to high priority messages in the CAN-bus, the delay does not affect the synchronization since all ECUs will receive the delayed message at the same time and will be synchronizing to a same clock signal. Communication between different CAN-buses present synchronization issues as the CAN system cannot guarantee that each ECU will receive the message containing the synchronization time at a same instance of time. For example, in FIG. 1, ECUs within the first CAN-bus 12 and the second CAN-bus 14 share data. Communication on the first CAN-bus 12 is open and a message may be readily transmitted on the CAN-bus 12, but the second CAN-bus 14 has a delay. If a message containing a synchronized time is sent out to all ECUs on both CAN-buses, then all ECU's on the first CAN-bus 12 will receive the time synchronization message and adjust their local clocks prior to the ECUs on the second CAN-bus 14 receiving the time synchronization message. As a result, local clocks of the ECUs of the first CAN-bus 12 will not be synchronized with the local clocks of the ECUs of the second CAN-bus 14. Any data shared between the two ECUs of the different CAN-buses may be improperly integrated due to the unsynchronized time stamping of the data. Therefore, the embodiments described herein provide a technique for synchronizing local clocks across asynchronous CAN-buses.

The master control unit 26 as shown in FIG. 1 is directly coupled to each CAN-bus or is indirectly coupled to a CAN-bus through one or more gateways 32. Each microprocessor 28 and 30 within the master control unit 26 estimates a protocol stack time delay for each CAN-bus that it is directly coupled to. The protocol stack time delay is determined by the difference in time when a message is generated for transmission by a respective ECU on a respective CAN-bus and when the message is actually transmitted on the respective CAN-bus. For example, microprocessor 28 communicates with ECUs on the first CAN-bus 12 to retrieve information for determining delays. The data within the message is time-stamped when the respective message is actually transmitted on the first CAN-bus 12. The microprocessor 28 determines the difference between the time when data is time-stamped by the ECU and the time when the message is actually transmitted on the CAN-bus 12. The delay may be determined by the following formula:

$$\text{Delay } d_1 = \text{Transmission time(at bus)} - \text{Generation time (at source)} \quad (1).$$

A plurality of time-stamped data may be collected from various sensors on the CAN-bus 12 to determine an average delay time. Each delay is determined using the formula set forth in eq. (1). The average delay is represented by the following formula:

$$\text{Avg. Delay(Expected)} = (d_0 + d_1 + d_2 + d_3 \ldots + d_n)/n. \quad (2)$$

The use of high priority CAN identification will guarantee minimal variation due to delay from bus arbitration. Moreover, when determining the expected delay, an option may be to remove the largest and/or smallest delay time from the group before calculating the average delay time.

In FIG. 1, microprocessor 28 determines the delay time for each respective CAN-bus that it is coupled to, specifically, the first CAN-bus 12, the second CAN-bus 14, and the third CAN-bus 16. Microprocessor 30 determines the delays for the fifth CAN-bus 20. The gateway ECU 32 communicates with microprocessor 28 for providing delay information relating not only to the protocol stack delays on the fourth CAN-bus 18, but will also provide delays relating to the processing of data involving the interoperability between the third CAN-bus 16 and the fourth CAN-bus 18.

After each delay is determined for each of the CAN-buses in the CAN system 10, the master control unit 26 receives a global time from a time synchronization source. The time synchronization source may be an internal synchronization source 34 such as an internal clock of the master control unit 26 or the network timing protocol (NTP). The time synchronization source may also be an external time synchronization source 36 such as, but not limited to, a vehicle GPS receiver, a CDMA cell phone time signal, an atomic clock signal, a roadside unit in a vehicle-to-infrastructure system, an entity in a vehicle-to-vehicle communication system, or the internet.

The master control unit 26 determines an adjusted global time for each CAN-bus by adding the expected delay for a respective CAN-bus to the global time received by the time synchronization source. For CAN-buses that have no delay, the adjusted global time will be the global time as received by the time synchronization source.

In regards to CAN-buses that are coupled to the master control unit 26 through the gateway 32 such as the fourth CAN-bus 18, the message will contain the adjusted global time, which includes both the estimated protocol stack time delay of the fourth CAN-bus 18 and estimated gateway time delay. Adjusted global times of any additional CAN-buses that are coupled by another gateway are determined by adding the respective gateway time delays and the protocol stack time delays.

Upon each ECU of each CAN-bus receiving their respective time synchronization message, each ECU will synchronize their local clocks based on the adjusted global time provided in the received message. As a result, each ECU within the CAN system 10 will be time synchronized with one another. Data may be readily time-stamped and transferred between ECUs of different CAN-buses for data sharing and integration.

It should be understood that the advantages of the embodiments described herein are not isolated to a CAN system for one vehicle, but may be applied to data sharing between a plurality of vehicles within a V2V system or entities within any Vehicle-to-Any road user entity (V2X) system. The same procedure is applied to a plurality of vehicles such that a consensus between the vehicles or entities is made as to what source will be utilized as the time synchronization source. Thereafter, each vehicle determines its respective delays on each of its CAN-buses. The global time provided by the time synchronization source is then adjusted with respect to the delays encountered in each CAN-bus of each vehicle. The result is a plurality of participating vehicles being time synchronized to a common time source. It should also be understood that the time synchronization source can be any one of the vehicles so long as all the vehicles participating agree as to which vehicle is the global time source. Under this procedure, the V2V ECU within each vehicle will function as an electronic control unit and the agreed upon vehicle providing the time synchronization will function as the master control unit for the group.

Figure 2:
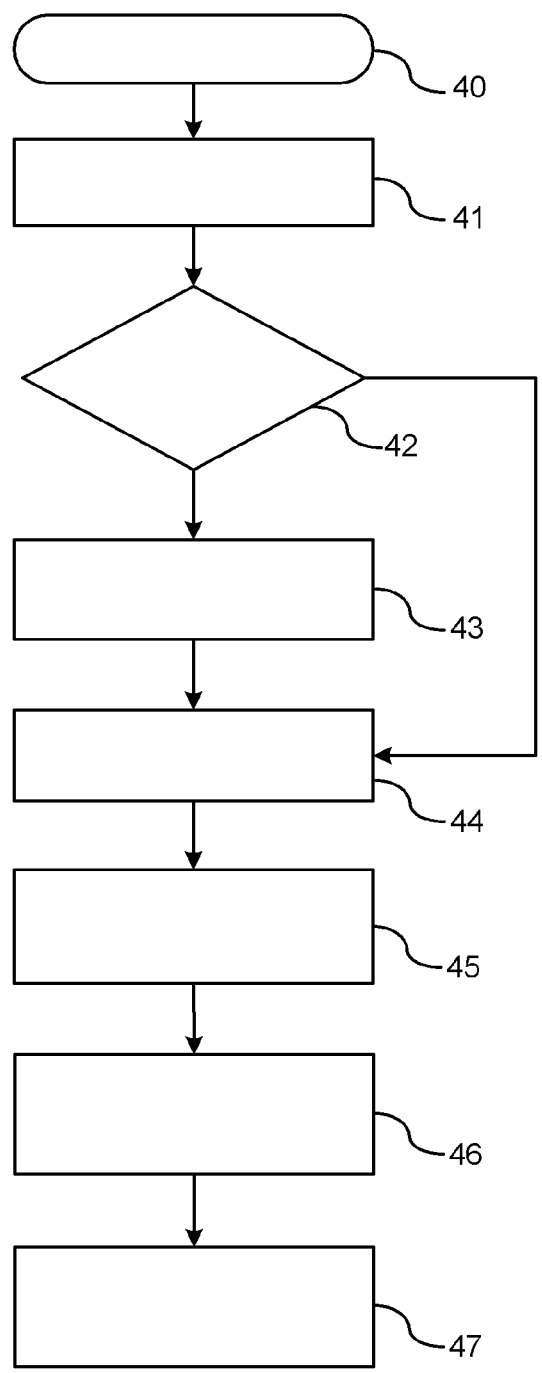
FIG. 2 is a flowchart of a method for synchronizing time in the controller area network system.

FIG. 2 illustrates a method for synchronizing time within a vehicle CAN system. In step 40, the synchronization routine is initialized. In step 41, respective time delays are estimated for each CAN-bus within the CAN system. The time delays are protocol stack delays that are the difference between the time when the message is generated and the time when the message is actually transmitted.

In step 42, a determination is made as to whether any gateways are present between two CAN-buses. If no gateways are present, then the routine proceeds to step 44. If gateways are present, the routine proceeds to step 43.

In step 43, a gateway time delay and the protocol stack time delay of the forward looking CAN-bus is determined. The gateway delay includes time delays as a result of the processing data between the two CAN-buses, and the protocol stack time delay includes delays in transmitting messages in the forward looking CAN-bus.

In step 44, a global time is received from a time synchronization source.

In step 45, the global time associated with each CAN-bus is adjusted based on the expected delays determined for each CAN-bus. Each message transmitted over a CAN-bus will include the adjusted global time that has been adjusted based on the delays determined for that respective CAN-bus.

In step 46, messages are transmitted by the master control unit that includes the adjusted global time for each respective CAN-bus.

In step 47, each ECU on a respective CAN-bus adjusts their local clock to adjusted global time contained in the received message.

Figure 3:
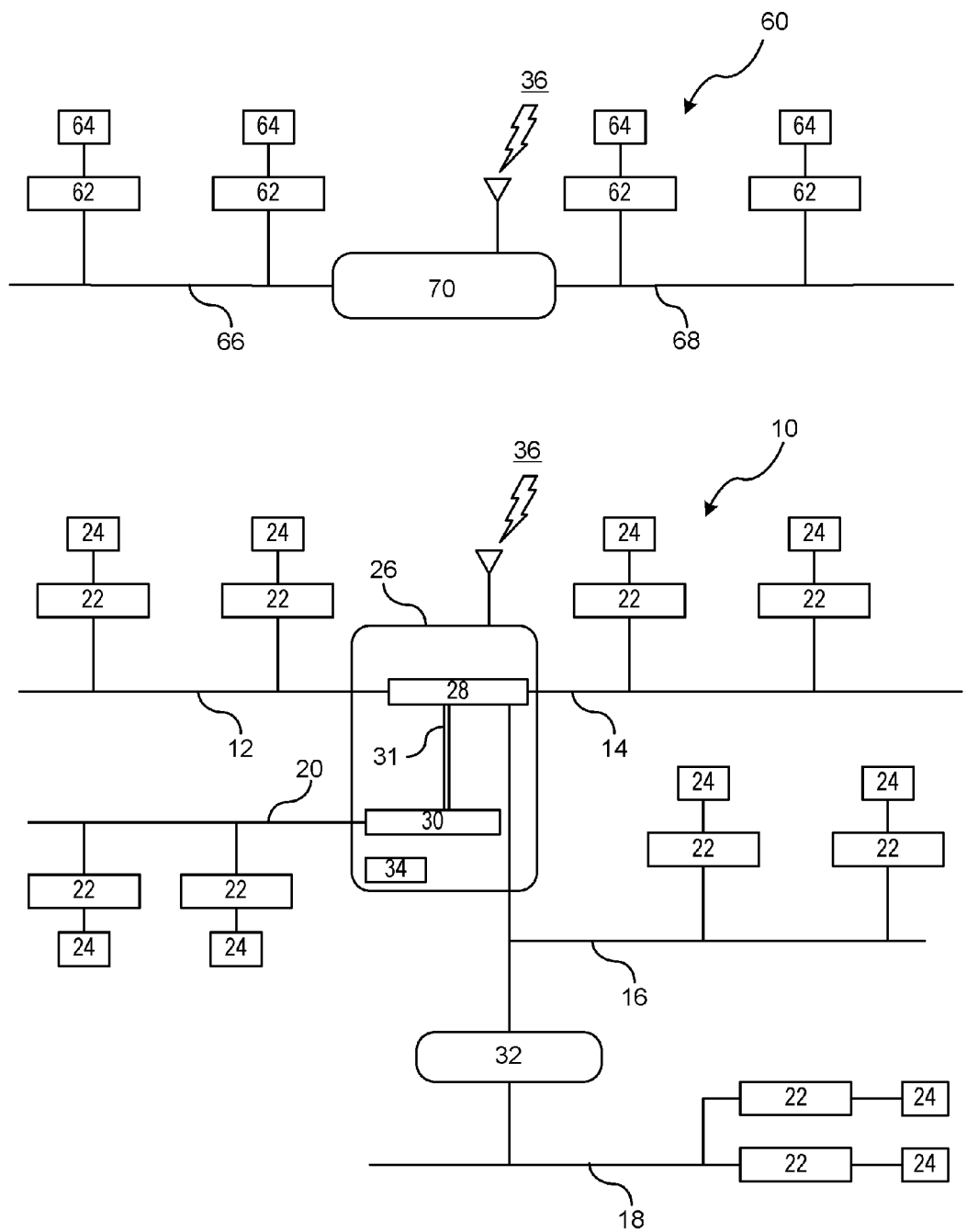
FIG. 3 illustrates a flowchart of an architectural layout of a controller area network for a V2V communication system.

FIG. 3 illustrates an embodiment utilizing V2V communications between vehicle communication system 30 and vehicle communication system 60 of another vehicle. The vehicle communication system 60 includes a plurality of electronic control units (ECUs) 62 which share data with one another. Each of the plurality of ECUs 62 is coupled to one or more sensors 64. A plurality of CAN buses 66 and 68 are coupled to a master control unit 70 within the vehicle communication system 60. Under V2V communications between vehicle communication system 10 and vehicle communication system 60, two respective electronic control units of the different vehicles share data with one another.

To share the data, the local clocks of the ECUs of each vehicle must be synchronized in order to successfully combine data between the vehicles. For example, a first vehicle includes vehicle communication system 10 and a second vehicle includes vehicle communication system 60. The first vehicle is closely following the second vehicle. The first vehicle has a vehicle application that provides automatic braking control based not only on the data provided by the sensors of its own system, but may rely on data provided by the second vehicle. Communications between the first vehicle and the second vehicle is beneficial for understanding the braking force and speed of the second vehicle. When the second vehicle initiates a hard brake action, one of the respective ECUs 62 from the second vehicle obtains the sensed braking data and speed data as a result of the hard braking action. The braking and speed data signal from the second vehicle if communicated to the first vehicle could be used to actuate automatic braking of the first vehicle. To determine if the automatic braking is necessitated, the first vehicle must obtain its own speed data from one of its respective ECUs 22 and analyze the braking and speed data provided by the second vehicle. However, the integration and analysis of the data from both vehicles will only be useful if the data is obtained from sensors at substantially a same instance of time. If each of the data is not from obtained from substantially a same instance of time, then the first vehicle may be making decisions based on data that is not current/timely.

To determine whether the data from both vehicles can be combined, the messages containing the data are time-stamped for determining the respective time when the data is obtained. Therefore, the local clocks of each vehicle communication system must be synchronized within one another. Utilizing the procedures described herein, the local clocks of each ECU of both vehicles are synchronized with one another utilizing a time synchronization source 36. Each communication system adjusts the global time received by the time synchronization source 36 and incorporates the expected delays of each CAN-bus. As a result, each local clock in each ECU for each vehicle is synchronized. This allows a respective ECU to make a direct comparison of the obtained data to determine if the data was sensed at substantially a same instance of time.

While certain embodiments of the present invention have been described in detail, those familiar with the art to which this invention relates will recognize various alternative designs and embodiments for practicing the invention as defined by the following claims.

What is claimed is:

1. A method for synchronizing time in an unsynchronized vehicle controller area network system, the system having a plurality of electronic control units in communication within one another via a plurality of controller area network buses, the electronic control units are in communication with sensing devices for collecting sensed data obtained by the sensing devices, each electronic control unit transmitting messages on the plurality of controller area network buses for sharing sensed data with other electronic control units, and the plurality of electronic control units are in communication with a master control unit vehicle via the plurality of controller area network buses, the method comprising the steps of:

the master control unit receiving a global time from a time synchronization source;

the master control unit estimating a respective time delay in transmitting messages by the electronic control units in each controller area network bus, the time delay being a difference between a time when a message is generated by a respective electronic control unit for transmission on a respective controller area network bus and a time when the message is transmitted on the respective controller area network bus;

adjusting the global time for each respective controller area network bus based on the estimated time delays associated with each respective controller area network bus; and transmitting global time messages from the master control unit to each electronic control unit that include the adjusted global times for an associated controller area network bus, wherein each electronic control unit connected to the controller area network receiving a respective global time message synchronizes a local clock based on the adjusted global time in the respective global time message.

2. The method of claim 1 wherein the vehicle controller area network system includes gateways for providing system interoperability between adjoining controller area network buses, wherein the gateway delays are added to the time delays and transmitted to respective electronic control units succeeding the gateway.

3. The method of claim 1 wherein sensed data obtained by a sensing device is collected by a respective electronic control unit, wherein the sensed data is time-stamped by the respective electronic control unit using the synchronized local clock prior to being transmitted on the respective controller area network bus.

4. The method of claim 3 wherein the sensed data transmitted by electronic control units of different controller area network buses is integrated based on the synchronized time-stamp of the sensed data.

5. The method of claim 4 wherein a global time is transmitted to a plurality of vehicles, wherein a respective master control unit of each vehicle determines time delays on each respective controller area network bus, wherein the global time is adjusted based on the time delay of each controller area network in each vehicle, wherein the adjusted global times determined by each master control unit of each vehicle are transmitted over each respective controller area network bus for synchronizing local clocks of the electronic control units of the plurality of vehicles.

6. The method of claim 5 wherein sensed data from the plurality of vehicles is wirelessly transmitted between the plurality of vehicles, wherein the sensed data from the plurality of vehicles is integrated based on the time-stamp of the sensed data.

7. The method of claim 1 wherein the global time is obtained from a GPS time source.

8. The method of claim 1 wherein the global time is obtained from a cell phone signal.

9. The method of claim 1 wherein the global time is obtained from an atomic clock.

10. The method of claim 1 wherein the global time is obtained from an internet.

11. The method of claim 1 wherein the global time is obtained from a designated vehicle within a group of vehicles in a vehicle-to-vehicle communication system.

12. The method of claim 1 wherein the global time is obtained from a road side equipment of a vehicle-to-infrastructure communication system.

13. A vehicle communication system comprising:
a plurality of sensing devices for obtaining vehicle-related data;
a plurality of electronic control units for receiving vehicle-related data from the plurality of sensing devices;
a plurality of controller area network buses coupled to the plurality of electronic control units for transmitting the vehicle-related data;
a master control unit in communication with each of the plurality of controller area network buses, the master control unit estimating a respective time delay for messages transmitted on each controller area network bus, the time delay being a difference between a time when messages are generated for transmitting and a time when messages are expected to be transmitted on an associated controller area network bus;
a time synchronization source for generating a global time;
wherein the global time is adjusted by the master control unit for each respective controller area network bus based on the respective time delay determined in each controller area network bus, wherein the master control unit transmits a respective message on each controller area network bus that includes the respective adjusted global time for each controller area network bus, and wherein each electronic control unit receiving the respective message synchronizes a local clock to the adjusted global time received in the respective message.

14. The system of claim 13 wherein the time delay determined by the master control unit for an associated controller area network bus is based on an average delay that is a function of a predetermined number of messages generated and transmitted on the associated controller area network bus.

15. The system of claim 13 wherein the time synchronization source is an in-vehicle time synchronization source.

16. The system of claim 13 wherein the time synchronization source is an external time synchronization source.

17. The system of claim 16 wherein external time synchronization source is provided through a vehicle-to-vehicle communication network.

18. The system of claim 16 wherein external time synchronization source is provided through vehicle-to-infrastructure communication network.

19. The system of claim 16 wherein external time synchronization source is a cellular phone communication service.

20. The system of claim 16 further comprising a gateway coupled to the controller area network buses, wherein the gateway provides system interoperability between two adjoining controller area network buses, wherein the gateway communicates to the master control unit time delay data relating to time delays of messages being processed through the gateway, wherein the master control unit adds the time delay of the gateway to the adjusted global time, and wherein the adjusted global time that includes the time delay of the gateway is transmitted on to electronic control units succeeding the gateway for local clock synchronization.

* * * * *